United States Patent [19]
Bennett

[11] Patent Number: 5,910,092
[45] Date of Patent: Jun. 8, 1999

[54] ROW CROP HEADER SHIELD WITH DETACHABLE SHIELDS

[75] Inventor: Kelvin E. Bennett, Geneseo, Ill.

[73] Assignee: Case Corporation, Racine, Wis.

[21] Appl. No.: 08/935,305

[22] Filed: Sep. 22, 1997

[51] Int. Cl.$^6$ .................................................. A01D 45/02
[52] U.S. Cl. .............................................. 56/119; 56/314
[58] Field of Search ..................................... 56/12.8, 14.1, 56/14.3, 14.6, 16.6, 98, 51, 106, 105, 119, 314, 364, 94, DIG. 1; 460/16, 73

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 1,852,702 | 10/1932 | Coultas et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |

(List continued on next page.)

OTHER PUBLICATIONS

Allis–Chalmers Tractor Division–Milwaukee, U.S.A., "1918–1960, An Informal History", Copyright 1989 by Alan C. King.

Operators Manual, Setting Up Instructions, "McCormick 34HM–21 Corn Snapper (Two Row, Mounted Type)", International Harvester Company.

Instruction Manual and Parts List, "Snapping Unit Frame Field Improvement Parts for McCormick–Deering, No. 14P, No. 24, Corn Pickers", International Harvester Company.

CP–8 McCormick Parts Catalog, "34HM–20 Corn Picker, 34HM–21 Corn Snapper, 34HM–22 Sweet Corn Picker (Two Row, Mounted–Type)", International Harvester.

*Farm Show*, vol. 20, No. 5, 1996—"Build–It–Yourself" Narrow Row Header Kit.

*Farm Industry News*, vol. 29, No. 11, 1996—"Does Narrow Row Corn Add Up?".

*Ontario Farmer*, vol. 29, No. 40, 1996—"Thinking 15–Inch".

1000 Series Corn Head, Operators Manual, 1995 Case Corporation.

1000 Series Corn Head, Parts Catalog, 1993 Case Corporation.

*Primary Examiner*—Thomas B. Will
*Assistant Examiner*—Robert Pezzuto
*Attorney, Agent, or Firm*—Foley & Lardner

[57] ABSTRACT

A row crop header includes a frame, a first shield, a first hinge mechanism pivotably coupling the first shield to the frame, a second shield and a second hinge mechanism pivotably coupling the second shield to the first shield. The first hinge mechanism includes a first female coupling member coupled to a first one of the first shield and the frame and a first male coupling member coupled to a second one of the first shield and the frame. The first male coupling member is rotatably received within the first female coupling member for pivotably coupling the first shield to the frame. The first male coupling member is removable from the first female coupling member upon selective rotation of the first male and first female coupling members relative to one another. The second hinge mechanism includes a second female coupling member coupled to one of the first shields and the second shield and a second male coupling member coupled to the other of the first shield and the second shield. The second male coupling member is rotatably received within the second female coupling member for pivotally coupling the first shield to the second shield. The second male coupling member is removable from the second female coupling member upon selective rotation of the second male and female coupling members relative to one another.

10 Claims, 5 Drawing Sheets

U.S. PATENT DOCUMENTS

| | | |
|---|---|---|
| 3,496,708 | 2/1970 | Bornzin . |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,269,017 | 5/1981 | deBuhr et al. . |
| 4,327,542 | 5/1982 | Van Ginhoven . |
| 4,333,304 | 6/1982 | Greiner et al. . |
| 4,403,467 | 9/1983 | Baugh . |
| 4,446,682 | 5/1984 | Jennen et al. . |
| 4,493,181 | 1/1985 | Glendenning et al. . |
| 4,502,270 | 3/1985 | Shupert . |
| 4,531,351 | 7/1985 | Sousek . |
| 4,538,404 | 9/1985 | Heimark, Jr. et al. . |
| 4,598,535 | 7/1986 | Sousek . |
| 4,729,212 | 3/1988 | Rabitsch . |
| 4,771,592 | 9/1988 | Krone et al. . |
| 4,805,388 | 2/1989 | Kell . |
| 4,835,954 | 6/1989 | Enzmann . |
| 5,060,464 | 10/1991 | Caron . |
| 5,195,309 | 3/1993 | Mossman . |
| 5,528,887 | 6/1996 | Nagy et al. . |
| 5,775,076 | 7/1998 | Mossman .................................. 56/119 |
| 5,787,697 | 8/1998 | Post ........................................... 56/119 |

FIG. 7C

ROW CROP HEADER SHIELD WITH DETACHABLE SHIELDS

FIELD OF THE INVENTION

This invention relates to a row crop harvesting machine. More particularly, this invention relates to a header for a row crop harvesting machine with row unit hoods that are easily pivoted for inspection of the row unit, or for removal of the hoods.

BACKGROUND OF THE INVENTION

Row unit hoods and dividers (forward, tapered hoods) are used to direct ears and stalks of corn into a gathering unit on a corn head while protecting the row unit gathering mechanism. These hoods and dividers are typically mounted to the row unit arm on one end and secured to the row unit arm on the other end using a latch or fastener. These mounting configurations typically require a tool for disassembly and removal.

Several variations of header row unit hoods and dividers have been developed for allowing pivotal access to the row unit. U.S. Pat. No. 4,446,682 teaches hingedly mounted hoods with two parts articulately connected to one another so that they can be pivoted to and fixed in a tipped roof shape. U.S. Pat. No. 4,227,368 teaches a hood assembly composed of left and right-hand portions being pivotable away from each other about a fore and aft axis and being releasably secured by spring latches. Neither of these variations of row unit hoods and dividers allow easy, adequate access for full inspection of the row unit, or toolless removal of the dividers and hoods.

Since most conventional hoods and dividers are wide and constructed of metal, they can be heavy and cumbersome to move. However, the last several years has seen a rapid increase in the research and development of lighter and narrower plastic hoods and dividers. Future worldwide road transportation regulations may further promote development of lighter, narrower hoods and dividers by defining acceptable size and shape requirements. Therefore, customer demand for lighter, narrower hoods and dividers that can be easily removed for storing, transporting, cleaning, inspecting, servicing, and shipping will increase.

SUMMARY OF THE INVENTION

In one preferred embodiment, the improved hinge mechanism is used in a row crop header to pivotably couple a shield to a frame. The present invention provides an improved hinge mechanism for coupling shields to row crop headers. The improved hinge mechanism enables the shield to be easily pivoted or rotated for inspection or cleaning. At the same time, the improved hinge mechanism enables the shield to be easily disconnected from the row crop header without tools or other disconnection devices. The improved hinge mechanism may be used to couple a shield directly to the frame or to couple a shield directly to an adjacent shield. The hinge mechanism includes a female coupling member coupled to a first one of the shield and the frame, and a male coupling member coupled to a second one of the shield and the frame. A male coupling member is rotatably received within the female coupling member for pivotally coupling the shield to the frame. The male coupling member is removable from the female coupling member upon selective rotation of the male and female coupling members relative to one another to permit the shield to be removed from the frame. In another preferred embodiment, the improved hinge mechanism is used to pivotally couple a first shield to a second shield. The hinge mechanism includes a female coupling member coupled to one of the first and second shields and a male coupling member coupled to the other of the first and second shields. The male coupling member is rotatably received within the female coupling member for pivotally coupling the first shield to the second shield. The male coupling member is removable from the female coupling member upon selective rotation of the male and female coupling members relative to one another.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
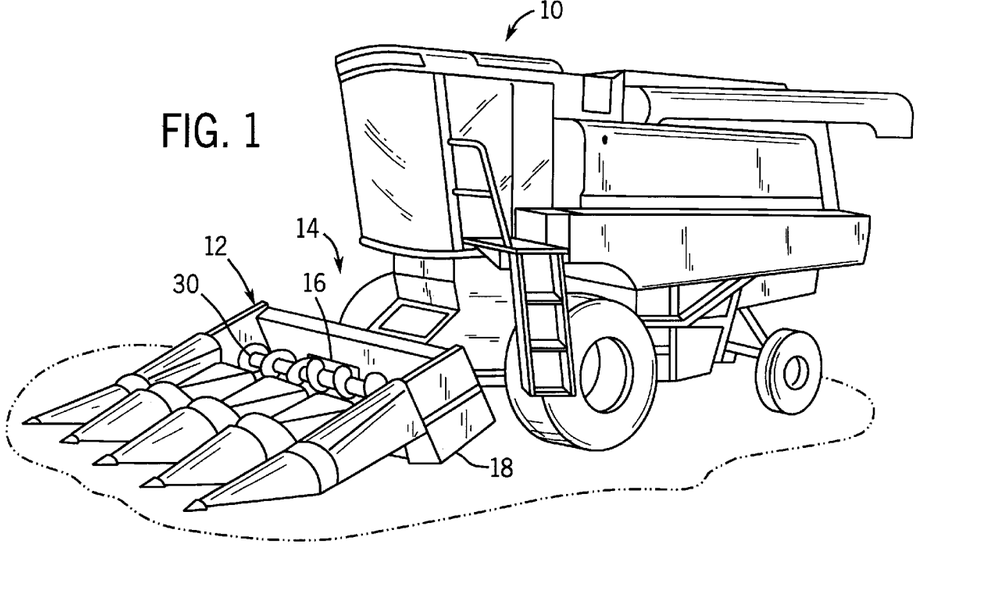
FIG. 1 is a perspective view of a harvesting machine with an attached row crop header provided by the invention.
Figure 2:
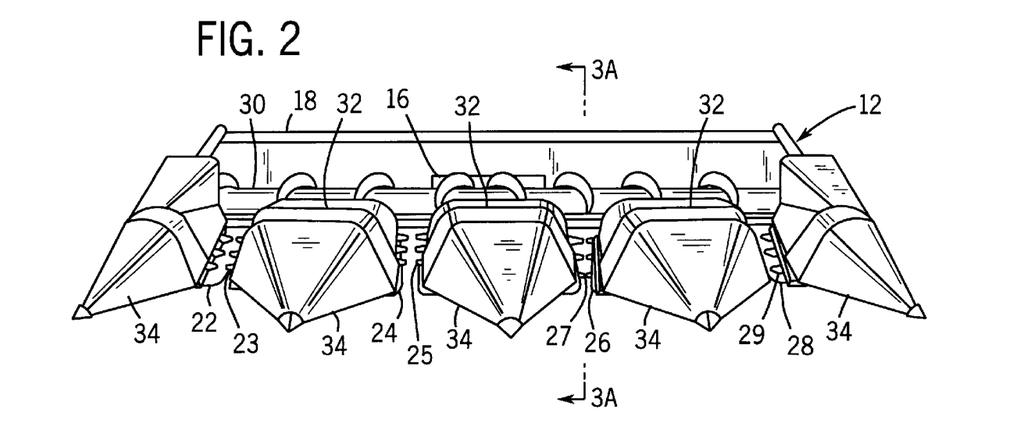
FIG. 2 is a perspective front view of the row crop header shown in FIG. 1.

FIGS. 1 and 2 illustrate harvesting machine 10 including header 12. FIG. 1 is a perspective view of header 12 mounted to harvesting machine 10. FIG. 2 is a front perspective view of header 12. Harvesting machine 10 comprises a conventionally known combine having a front end 14 configured for mounting header 12 and receiving harvested crops from header 12 through a central intake 16. As is conventionally known, harvesting machine 10 comprises a combine including a threshing mechanism for separating the grain or seeds from the remaining straw or chaff. Alternatively, header 12 may be used with a variety of other harvesting machines used for harvesting row crops such as corn pickers and the like.

Header 12 is a row crop harvesting head designed for harvesting multiple crop rows. In the preferred embodiment illustrated, header 12 is a corn head designed for moving ears of corn from respective stalks and for conveying the removed ears of corn to central intake 16 of harvesting machine 10. As shown by FIG. 2, header 12 generally includes frame 18, row units 22, 24, 26, 28, gatherers 23, 25, 27 and 29, cross conveyor 30, gatherer hoods or shields 32, and divider shields 34. Frame 18 is a generally rigid, elongate support structure configured for being mounted to forward end 14 of harvesting machine 10 and for supporting row units 22, 24, 26 and 28, gatherers 23, 25, 27 and 29, cross conveyor 30 and shields 32, 34. As can be appreciated, frame 18 may have a variety of alternative sizes and configurations depending upon the type of harvesting machine to which header 12 is attached, the particular type of row crops being harvested and the number of row crops supported by frame 18.

Row units 22, 24, 26 and 28 are supported by frame 18 between adjacent or consecutive divider shields 34 transversely across header 12. Each row unit 22, 24, 26, and 28 extends rearwardly from divider shields 34 towards cross conveyor 30. Each row unit 22, 24, 26, and 28 is designed for receiving corresponding rows of corn channeled by divider shields 34 and for removing the ears of corn from their respective stalks.

Gatherers 23, 25, 27, and 29 are supported by frame 18 adjacent row units 22, 24, 26, and 28, respectively. Gatherers 23, 25, 27 and 29 convey ears of corn from row units 22, 24, 26 and 28 to cross conveyor 30.

Cross conveyor 30 preferably comprises an elongate auger rotably mounted at opposite ends to frame 18. Cross conveyor 30 transversely extends across and adjacent to ends of gatherers 23, 25, 27 and 29 so as to receive the corn ears conveyed by gatherers 23, 25, 27, and 29. Upon being rotated by a conventional drive mechanism, cross conveyor 30 conveys ears of corn from gatherers 23, 25, 27 and 29 to central intake 16 of harvesting machine 10. Although cross conveyor 30 is illustrated as an auger including oppositely wound vanes for conveying the ears of corn to central intake 16, cross conveyor 30 may alternatively comprise any one of a variety of well known conveying mechanisms such as moving webs or crop conveyors and the like. As can be appreciated, cross conveyor 30 may be omitted in headers having a limited number of row units and a reduced width.

Gatherer shields 32 are generally elongate semi-cylindrical or semi-rectangular hoods supported by frame 18 so as to at least partially cover and protect corresponding gatherers 23, 25, 27 and 29. In the preferred embodiment illustrated, gatherer shields 32 are formed from a plastic such as high density polyethylene. Alternatively, gatherer shields 32 may be formed from other materials such as metal.

Divider shields 34 are generally conical shaped hoods supported by frame 18 forward of gatherer shields 32 so as to channel and direct crop rows, such as corn, to row units 22, 24, 26 and 28. In the preferred embodiment illustrated, divider shields 34 are formed from a plastic such as high density polyethylene. Alternatively, divider shields 34 may be formed from other materials such as metal. In the preferred embodiment illustrated, divider shields 34 are connected to and supported by gatherer shields 32. Alternatively, as with gatherer shields 32, divider shields 34 may be connected and supported directly by frame 18. Both gatherer shields 32 and divider shields 34 are pivotally supported relative to frame 18 so as to permit gatherer shields 32 and divider shields 34 to be pivoted for easy inspection of gatherers 23, 25, 27 and 29. In addition, both gatherer shields 32 and divider shields 34 are connected to frame 18 so that gatherer shields 32 and divider shields 34 may be easily removed for cleaning, transportation or inspection without the use of tools or other equipment.

Figure 3A:
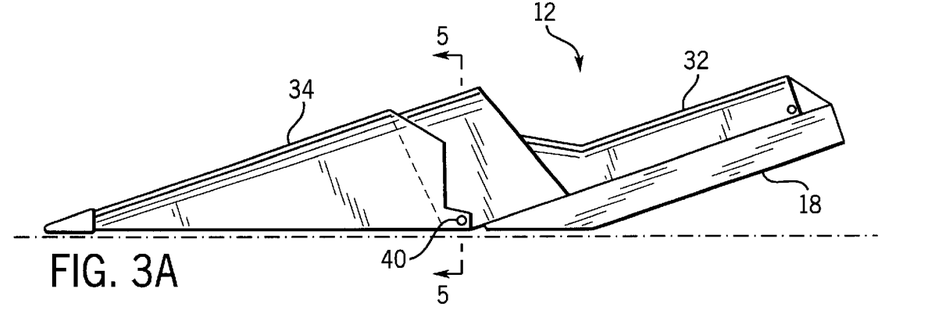
FIG. 3A is a side elevational view of a row unit of the row crop header with the divider shield and the gatherer shield in operating position.
Figure 3B:
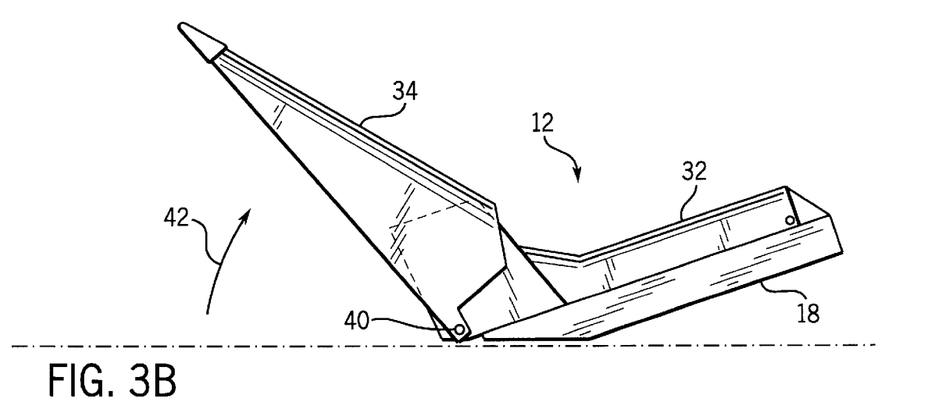
FIG. 3B is side elevational view of the row unit of the row crop header illustrating the divider shield being pivoted relative to the row unit.
Figure 3C:
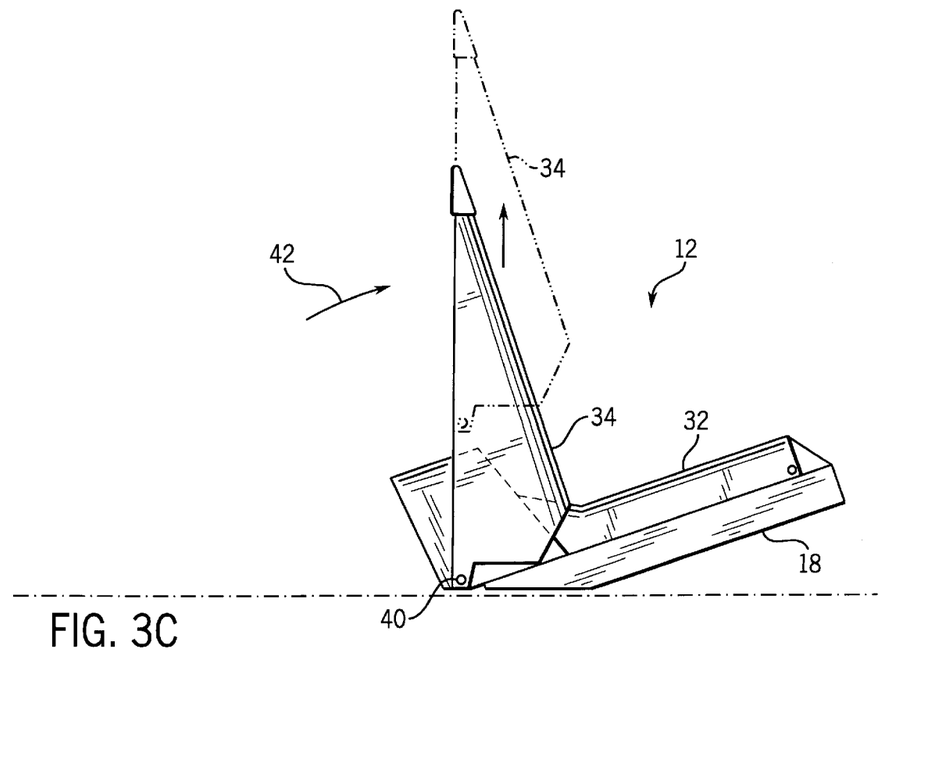
FIG. 3C is a side elevational view of the row unit of the row crop header illustrating the divider shield being further pivoted and removed from the row unit.

FIGS. 3A, 3B and 3C are side elevational views illustrating a single divider shield 34 being pivoted for inspection as well as for removal from frame 18. As best shown by FIGS. 3A–3C, divider shield 34 is pivotally coupled to gatherer shield 32 and frame 18 by hinge mechanism 40. As shown by FIG. 3B, hinge mechanism 40 enables divider shields 34 to pivot in a clockwise direction (indicated by arrow 42) to permit inspection of divider shield 34 as well as the gatherers (shown in FIG. 2). As further shown by FIG. 3C, continued rotation of divider shield 34 about the axis of hinge mechanism 40 in the clockwise direction as indicated by arrow 42 enables divider shield 34 to be simply and easily lifted to disconnect divider shield 34 from gatherer shield 32 and from frame 18 as indicated in phantom. In the preferred embodiment illustrated, hinge mechanism 40 is configured so as to permit divider shield 34 to be separated from gatherer shield 32 and frame 18 when divider shield 34 extends generally vertical, as shown in phantom. In the preferred embodiment illustrated, hinge mechanism 40 is specifically configured so as to permit divider shield 34 to be separated from frame 18 when divider shield 34 is rotated approximately 90 degrees from its resting position.

Figure 4A:
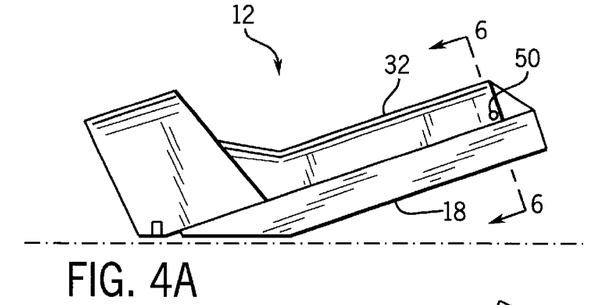
FIG. 4A is a side elevational view of the row unit of the row crop header with the divider shield removed.
Figure 4B:
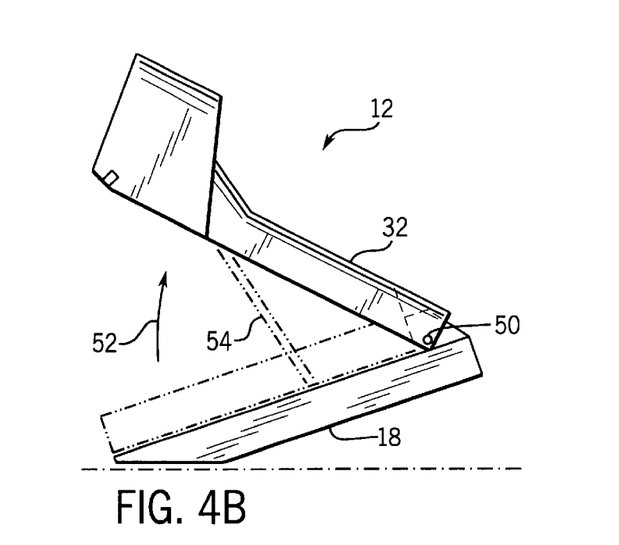
FIG. 4B is a side elevational view of the row unit of the row crop header illustrating the gatherer shield being pivoted and supported above the row unit.
Figure 4C:
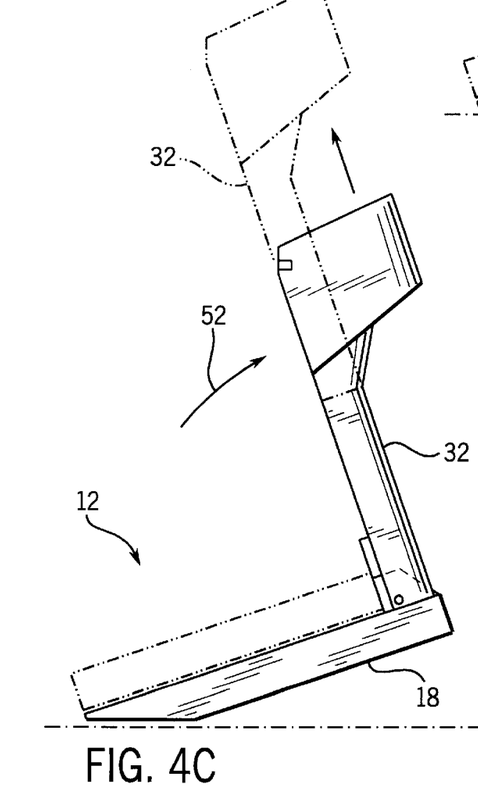
FIG. 4C is a side elevational view of the row unit of the row crop header illustrating the gatherer shield pivoted and removed from the row unit.

FIGS. 4A–4C are fragmentary side elevational views illustrating a single gatherer shield 32 being pivoted relative to frame 18 to permit inspection of the gatherers protected by gatherer shield 32 or to permit removal of gatherer shield 32 for cleaning, inspection or transportation. For purposes of illustration, gatherer shield 32 is illustrated with its corresponding divider shield 34 already removed. Alternatively, gatherer shield 32 may be pivoted while divider shield 34 remains coupled to gatherer shield 32. As best shown by FIGS. 4A–4C, gatherer shield 32 is pivotly coupled to frame 18 by hinge mechanism 50. As shown by FIG. 4B, hinge mechanism 50 enables gatherer shield 32 to be pivoted in a clockwise direction as indicated by arrow 52 and supported by conventional support such as prop rod 54 such that a gatherer supported by frame 18 below gatherer shield 32 may be inspected, repaired or cleaned. As shown by FIG. 4C, further rotation of gatherer shield 32 in the clockwise direction as indicated by arrow 52 enables gatherer shield 32 to be lifted and separated from frame 18 as indicated in phantom. In the preferred embodiment illustrated, hinge mechanism 50 is specifically configured so as to permit gatherer shield 32 to be separated from frame 18 when gatherer shield 32 is rotated approximately 90 degrees from its resting position.

Figure 5:
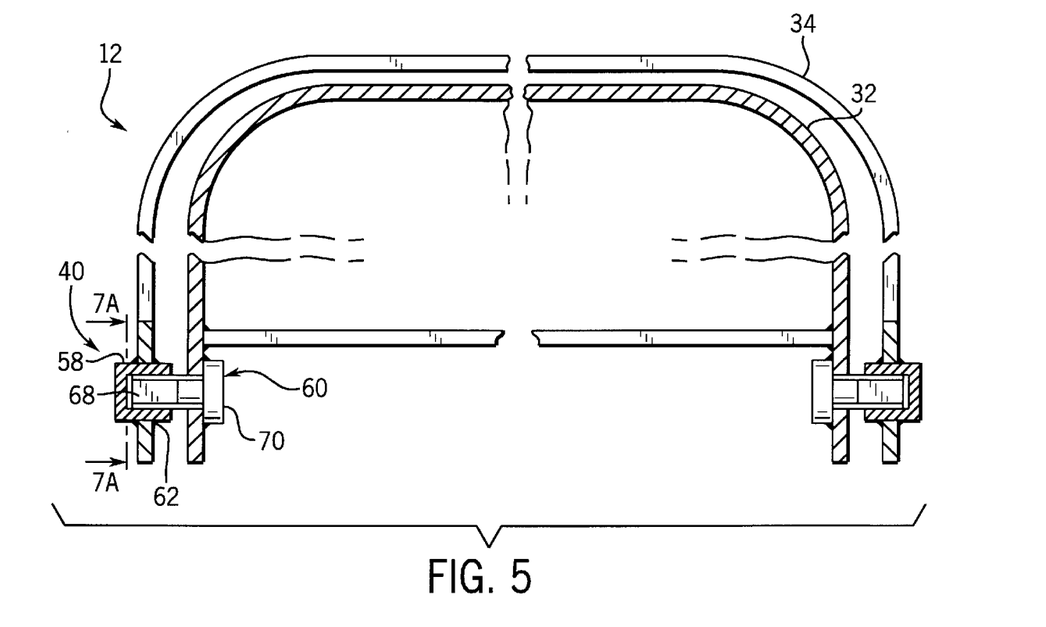
FIG. 5 is a sectional view of the divider shield of FIG. 3A taken along lines 5—5.
Figure 6:
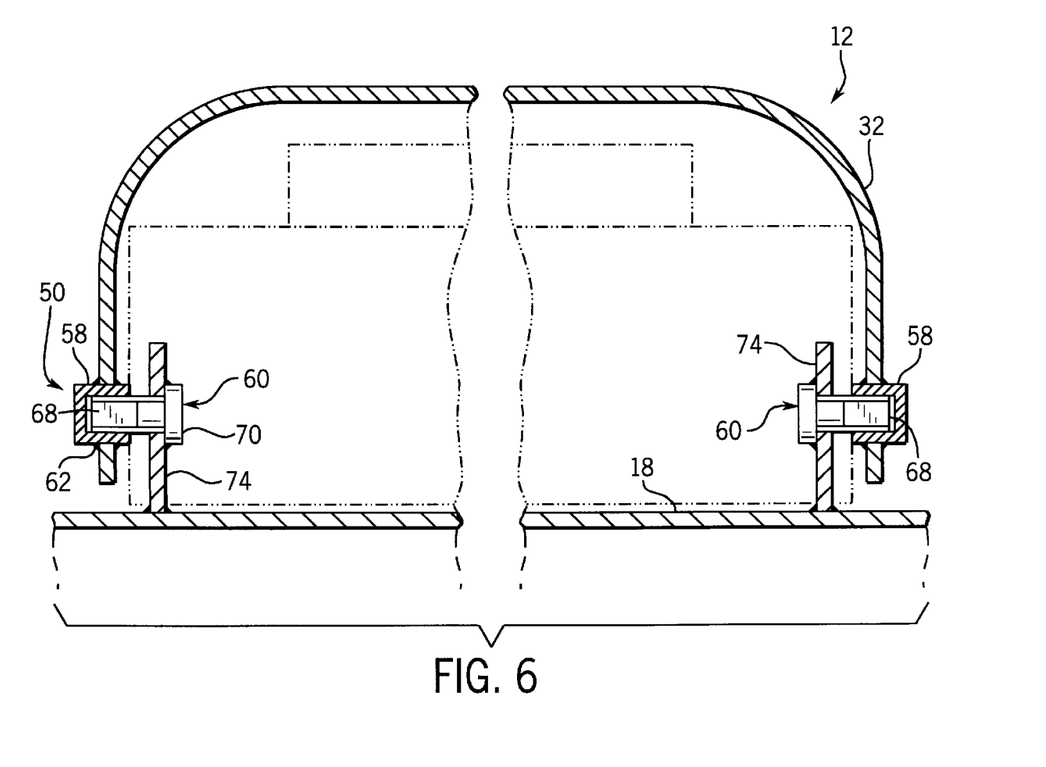
FIG. 6 is a sectional view of the hood of FIG. 4A taken along lines 6'6.
Figure 7A:
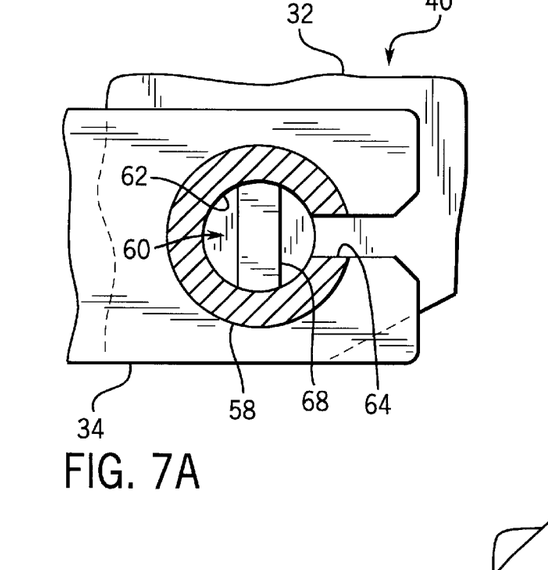
FIG. 7A is a cross sectional view of a hinge mechanism pivotally connecting the divider shield to a frame of the row unit.
Figure 7B:
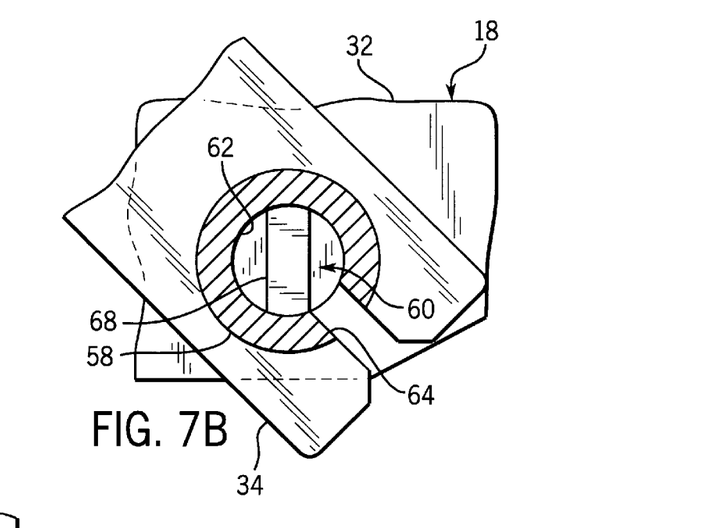
FIG. 7B is a cross sectional view of the hinge mechanism of FIG. 7A illustrating the divider shield pivoted relative to the frame.
Figure 7C:
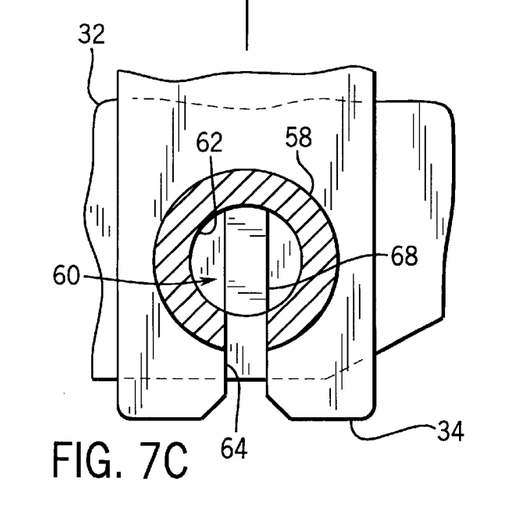
FIG. 7C is a cross sectional view of the hinge mechanism of FIG. 7A illustrating the divider shield further pivoted relative to the frame for removal of the divider shield from the frame.

FIGS. 5, 6, 7A, 7B, and 7C illustrate hinge mechanisms 40 and 50 in greater detail. FIG. 5 is a cross sectional view of hinge mechanism 40 taken along lines 5—5 of FIG. 3A. FIG. 6 is a cross sectional view of hinge mechanism 50 taken along lines 6—6 of FIG. 4A. FIGS. 7A–7C are sectional views of hinge mechanism 40 taken along lines 7A—7A of FIG. 5 illustrating binge mechanism 40 as divider shield 34 is pivoted in a clockwise direction. As best shown by FIGS. 5 and 7A–7C, hinge mechanism 40 generally includes female coupling member 58 and male coupling member 60.

Female coupling member 58 is fixedly coupled to or integrally formed as part of divider shield 34 and defines a bore 62 and an access opening 64. Bore 62 is sized for rotatably receiving a portion of male coupling member 60. In the preferred embodiment illustrated, female coupling member 68 comprises a cylindrical tube welded to divider shield 34 adjacent male coupling member 60. Although female coupling member 58 is illustrated as having a tubular cross sectional shape for defining bore 62, female coupling member 52 may have any one of a variety of outer surface configurations as long as female coupling member 58 defines a cylindrical inner bore 62.

Access opening 64 extends through female coupling member 58 and is in communication with bore 62. Access opening 64 is sized for permitting insertion of male coupling member 60 through access opening 64 into bore 62 or for removing male coupling member 60 from bore 62 through access opening 64. Access opening 64 has a width greater than a first dimension of male coupling member 60 and less than a second dimension of male coupling member 60. Access opening 64 extends through female coupling member 58 at a location such that male coupling member 60 will only fit through access opening 64 when appropriately rotated and aligned with access opening 64. As a result, female coupling member 58 captures and maintains male coupling member 60 within bore 62 to permit rotation of male coupling member 60 within bore 62 at all times except when male coupling member 60 is precisely aligned with access opening 64.

Male coupling member 60 is a generally elongate member fixedly coupled to or integrally formed as part of gatherer shield 32. Male coupling member 60 includes a female engaging portion 68 which extends from gatherer shield 32 into bore 62 of female coupling member 58. Female engaging portion 68 is sized and shaped so as to rotate within bore 62. Female engaging portion 68 is further sized and configured so as to have a first dimension greater than access opening 64 and a second dimension smaller than the width of access opening 64. In the preferred embodiment illustrated, female engaging portion 68 of male coupling member 60 comprises a generally elongate rectangular member having a length greater than the width of access opening 64 and a width smaller than the width of access opening 64. In the preferred embodiment illustrated, male coupling member 60 preferably includes a head 70 which butts against and is welded to gatherer shield 32.

As shown by FIGS. 7A–7C, hinge mechanism 40 rotatably or pivotally couples divider shield 34 to gatherer shield 32. Hinge mechanism 40 also permits divider shield 34 to be easily disconnected from gatherer shield 32 by mere rotation of divider shield 34 relative to gatherer shield 32. As shown by FIG. 7A, female engaging portion 68 of male coupling member 60 extends generally perpendicular to access opening 64 when divider shield 34 is in the lowered resting position shown in FIG. 3A. As a result, divider shield 34 cannot be disconnected from gatherer shield 32.

As shown by FIG. 7B, hinge mechanism 40 permits As shown by FIG. 7B, hinge mechanism 40 also permits rotation of divider shield 34 relative to gatherer shield 32 while maintaining the connection between divider shield 34 and gatherer shield 32. As a result, divider shield 34 may be rotated as shown in FIG. 3B for inspection and cleaning.

As shown by FIG. 7C, selected rotation of divider shield 34 relative to gatherer shield 32 aligns access opening 64 with female engaging portion 68 of male coupling member 60 to enable female engaging portion 68 to be lifted through access opening 64 to disconnect divider shield 34 from gatherer shield 32 without tools or other disconnection devices.

Although female coupling member 58 is illustrated in FIG. 5 as being fixedly coupled to and supported by divider shield 34 while male coupling member 60 is fixedly coupled to and supported by gatherer shield 32, the respective positions of female coupling member 58 and male coupling member 60 may be reversed. In particular, female coupling member 58 may alternatively be fixedly coupled to or integrally formed as part of gatherer shield 32 while male coupling member 60 may alternatively be fixedly coupled to or integrally formed as part of divider shield 34. Moreover, in lieu of divider shield 34 being fixedly coupled to gatherer shield 32 by female coupling member 58 and male coupling member 60 of hinge mechanism 40, divider shield 34 may alternatively be pivotably coupled directly to frame 18 by a hinge mechanism substantially identical to hinge mechanism 40. Such an alternative arrangement would allow the disconnection and removal of gatherer shield 32 without the disconnection and removal of divider shield 34.

FIG. 6 is a cross sectional view of hinge mechanism 50 taken along lines 6—6 of FIG. 4A. As shown by FIG. 6, hinge mechanism 50 is identical to hinge mechanism 40 except that hinge mechanism 50 couples gatherer shield 32 directly to frame 18. For ease of description, those elements of hinge mechanism 50 which correspond to elements of hinge mechanism 40 are numbered similarly. As shown by FIG. 6, frame 18 includes mounts 74 which project from frame 18 and which are fixably coupled to male coupling members 60. Mounts 74 support male coupling member 60 in engagement with female coupling members 58. Similar to divider shield 34, gatherer shield 32 may be rotated relative to frame 18 to permit inspection of the gatherers housed below gatherer shield 32. Upon selective rotation of gatherer shield 32 so as to align access opening 64 with male coupling member 60, gatherer shield 32 may be lifted and disconnected from frame 18 without tools or other disconnection devices.

Although female coupling member 58 is illustrated in FIG. 6 as part of gatherer shield 32 while male coupling member 60 is illustrated as being supported by frame 18, the respective positions of female coupling member 58 and male coupling member 60 may alternatively be reversed. In particular, female coupling member 58 may alternatively be fixedly coupled to and supported by mounts 74 while male coupling member 60 is fixedly coupled to and extending from gatherer shield 32. As can be appreciated, the exact configuration of female coupling member 58 and male coupling member 60 may vary depending upon the size, location and configuration of gatherer shield 32 and frame 18.

Other embodiments of the row crop header will be apparent to those skilled in the art from consideration of the specification disclosed herein. It is intended that the specification be considered as exemplary only, with the true scope and spirit of the invention being indicated by the following claims.

What is claimed is:

1. A row crop header comprising:
   a frame;
   a shield; and
   a first hinge mechanism pivotally coupling the shield to the frame, the first hinge mechanism including:
   a female coupling member coupled to a first one of the shield and the frame; and a male coupling member coupled to a second one of the shield and the frame, wherein the male coupling member is received within the female coupling member, wherein at least one of the male coupling member and the female coupling member are rotatable relative to one another to pivotally couple the shield to the frame about an axis, and wherein the male coupling member is removable from the female coupling member in a direction non-parallel to the axis upon selective rotation of at least one of the male and female coupling members relative to one another.

2. The row crop header of claim 1 wherein the female coupling member is fixedly secured to the frame and wherein the male coupling member is fixedly secured to a hood.

3. The row crop header of claim 1 wherein the first hinge mechanism extends along a first side of the shield and wherein the row crop header includes:

a second hinge mechanism extending along a second opposite side of the shield.

4. The row crop header of claim 1 wherein the female coupling member defines a bore about the axis for rotatably receiving the male coupling member and an access opening extending non-parallel to the axis and in communication with the bore through which the male coupling member is removed from the bore.

5. The row crop header of claim 4 wherein the access opening has a first width, and wherein the male coupling member has a length greater than the first width and a second width less than or equal to the first width.

6. A row crop header shield assembly comprising:

a first shield;

a second shield; and a first hinge mechanism pivotally coupling the first shield to the second shield, the first hinge mechanism including:

a female coupling member coupled to one of the first and second shields; and a male coupling member coupled to the other of the first and second shields, wherein the male coupling member is received within the female coupling member, wherein at least one of the male coupling member and the female coupling member are rotatable relative to one another to pivotally couple the first shield to the second shield about an axis, and wherein the male coupling member is removable from the female coupling member in a direction non-parallel to the axis upon selective rotation of the male and female coupling members relative to one another.

7. The row crop shield assembly of claim 6 wherein the first hinge mechanism extends along a first side of the first and second shields and wherein the row crop header shield assembly includes:

a second hinge extending along a second opposite side of the first and second shields.

8. The row crop header shield assembly of claim 6 wherein the female coupling member defines a bore about an axis for rotatably receiving the male coupling member and an a access opening extending oblique to the axis and in communication with the bore through which the male coupling member is removed from the bore.

9. The row crop header of claim 8 wherein the access opening has a first width, and wherein the male coupling member has a length greater than the first width and a second width less than or equal to the first width.

10. A row crop header comprising:

a frame;

a first shield;

a first hinge mechanism pivotally coupling the first shield to the frame, the first hinge mechanism including:

a first female coupling member coupled to a first one of the first shield and the frame; and a first male coupling member coupled to a second one of the first shield and the frame, wherein the first male coupling member is received within the first female coupling member, wherein at least one of the first male coupling member and the first female coupling member are rotatably relative to one another to pivotally couple the first shield to the frame about a first axis, and wherein the first male coupling member is removable from the first female coupling member in a direction oblique to the first axis upon selective rotation of the first male and female coupling members relative to one another;

a second shield forward the first shield; and a second hinge mechanism pivotally coupling the second shield to the first shield, the second hinge mechanism including:

a second female coupling member coupled to one of the first shield and the second shield; and a second male coupling member coupled to the other of the first shield and the second shield, wherein the second male coupling member is received within the second female coupling member, wherein at least on of the second male coupling member and the second female coupling member are rotatable relative to one another to pivotally couple the first shield to the second shield about a second axis, and wherein the second male coupling member in a direction non-parallel to the second axis is removable from the second female coupling member upon selective rotation of the second male and female coupling members relative to one another.

* * * * *